United States Patent [19]

Suzuki et al.

[11] 4,031,454

[45] June 21, 1977

[54] TRANSISTOR INVERTER

[75] Inventors: Tadao Suzuki; Tadao Yoshida; Shigeaki Wachi, all of Tokyo, Japan

[73] Assignee: Sony Corporation, Tokyo, Japan

[22] Filed: June 1, 1976

[21] Appl. No.: 691,827

[30] Foreign Application Priority Data

June 6, 1975   Japan ............................. 50-68708

[52] U.S. Cl. ..................... 321/2; 321/18; 331/113 A; 321/45 R
[51] Int. Cl.$^2$ ...................................... H02M 3/335
[58] Field of Search ............... 321/2, 18, 19, 45 R; 331/113 A

[56] References Cited

UNITED STATES PATENTS

| | | | |
|---|---|---|---|
| 3,004,226 | 10/1961 | Jensen | 331/113 A |
| 3,596,165 | 7/1971 | Andrews | 321/2 |
| 3,657,631 | 4/1972 | Martens et al. | 321/2 |
| 3,829,794 | 8/1974 | Gautherin | 331/113 A |

Primary Examiner—William M. Shoop
Attorney, Agent, or Firm—Hill, Gross, Simpson, Van Santen, Steadman, Chiara & Simpson

[57] ABSTRACT

A transistor inverter includes a pair of switching transistors each having base, emitter and collector electrodes, each of the collector and emitter circuits of which is connected between a DC voltage source through a primary winding of an output transformer, respectively, the secondary winding of which is connected to a rectifying circuit so as to produce a DC output voltage at its output. The transistor inverter also includes an input transformer with a saturable core and voltage feedback and current feedback circuits. The current feedback circuit has another transformer which controls the amount of current feedback, and the winding ratio of the primary and secondary windings is determined in connection with the current amplification factor of said first and second switching transistors in order to improve a switching speed of the switching transistors.

8 Claims, 2 Drawing Figures

TRANSISTOR INVERTER

BACKGROUND OF THE INVENTION

1. Field of the Invention:

The present invention relates generally to a transistor inverter, and is directed more particularly to a transistor inverter which has a controllable amount of current feedback.

2. Description of the Prior Art:

As a prior art transistor inverter, the fundamental circuit, which is disclosed in the U.S. Pat. No. 2,783,384, as "Electrical Inverter Circuits", is employed generally. With such a prior art transistor inverter, a pair of switching transistors are controlled in oscillation by a saturable transformer to produce an envelope wave pulse signal and an output DC voltage is produced by rectifying the pulse signal.

Further, with the prior art transistor inverter in order to stabilize the oscillation of the switching transistors, a current feedback winding is provided to positive-feedback a part of the output current from the transistors.

Although the transistor inverter provided with the current feedback winding is stabilized in oscillation, the amount of current feedback becomes too excessive by only providing a current feedback winding. As a result, its switching transistors are lowered in switching speed and hence its efficiency is deteriorated.

OBJECTS AND SUMMARY OF THE INVENTION

Accordingly, it is an object of the present invention to provide a transistor inverter free from the defects encountered in the prior art.

It is another object of the invention to provide a transistor inverter which is provided with a circuit capable of controlling the amount of current feedback.

It is a further object of the invention to provide a transistor inverter which has a current feedback transformer.

In accordance with an aspect of the present invention, there is provided a transistor inverter which comprises a DC voltage source having first, second and third terminals, an output transformer having primary and secondary windings, a pair of first and second transistors each having base, emitter and collector electrodes, each of the collector and emitter electrodes of said first and second transistors being connected between the first and second terminals of said DC voltage source and between the second and third terminals of said DC voltage source through the primary winding of said output transformer, respctively. An input transformer is also provided having a voltage feedback winding, a pair of voltage control windings and a saturable core. A circuit for coupling the voltage across said primary winding of said output transformer to said voltage feedback winding and connecting each of the voltage control windings of said input transformer between the base and emitter electrodes of said first and second transistors, respectively are provided. A DC voltage output circuit is connected to the secondary winding of said output transformer. A circuit for feeding back a part of the primary current flowing through the primary winding of the output transformer to the input transformer is provided which further includes a circuit to vary the amount of the current feedback.

The other objects, features and advantages of the present invention will become apparent from the following description taken in conjunction with the accompanying drawing.

DESCRIPTION OF THE PREFERRED EMBODIMENT

In order to better understand a transistor inverter according to the invention, a prior art transistor inverter will be now described in detail with reference to FIG. 1.

Figure 1:
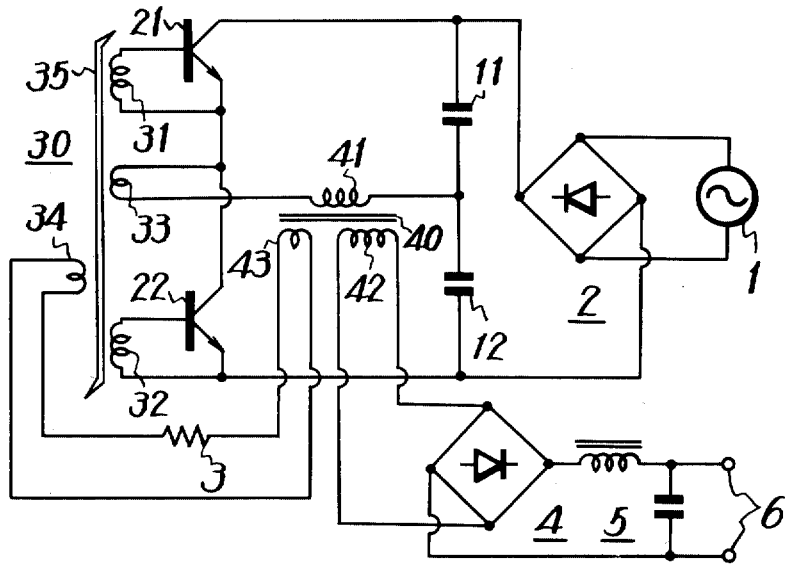
FIG. 1 is a circuit diagram showing a prior art transistor inverter.

In FIG. 1, 1 designates an AC power source. The input AC voltage from the AC power source 1 is supplied to a rectifying circuit 2 and the rectified output from the rectifying circuit 2 is supplied to a series connection of capacitors 11 and 12. A series connection between the collector electrode of a first NPN-type transistor 21 and the emitter electrode of a second NPN-type transistor 22 is connected in parallel to the series connection of the capacitors 11 and 12. An oscillation transformer 30, which is generally a saturable core type one, has voltage controlling windings 31 and 32 which are connected between the emitter and base electrodes of the transistors 21 and 22, respectively. The emitter electrode of the transistor 21 and the collector electrode of the transistor 22 are connected together to the connection point between the capacitors 11 and 12 through a current feedback winding 33 of the transformer 30 and an input winding 41 of a power source transformer 40. A voltage detecting winding 43 of the transformer 40 is connected through a resistor 3 to a voltage feedback winding 34 of the transformer 30, and an output winding 42 of the transformer 40 is connected to a rectifying circuit 4 such as a diode bridge which is then connected to a smoothing circuit 5 such as an L-C filter circuit. Output terminals 6 are led out from the smoothing circuit 5. In FIG. 1, 35 designates a saturable core of the transformer 30.

With the prior art transistor inverter described above, when the transistors 21 and 22 are made ON and OFF alternately, an alternating current is supplied to the input winding 41 of the transformer 40. Thus, a desired DC voltage can be delivered to the output terminals 6. In this case, the AC current flowing through the input winding 41 of the transformer 40 flows through the current feedback winding 33 of the transformer 30 to carry out current feedback and AC current induced across the winding 43 is supplied to the winding 34 of the transformer 30 to achieve voltage feedback, whereby the ON and OFF states of the transistors 21 and 22 are repeated.

With the transistor inverter described as above, if its oscillation frequency is selected high, the power source transformer 40 can be made compact and light in weight and hence the entire inverter can be made compact and light.

In the prior art, a power source transformer used as a main amplifier for an audio application is very large in size, and accordingly, a restriction is necessary on the size and design of the main amplifier and in the arrangement of it and its associated parts.

However, since the inverter described above is compact in size and shape, it can be designed freely, and no restriction is required in the size and design of the main amplifier in which the above inverter is employed. Also, no restriction is necessary in the arrangement of its associated parts.

The oscillation frequency $f$ of the above inverter is expressed as follows:

$$f = \frac{V_{BE}}{4SN_iB_s} \qquad (1)$$

where $V_{BE}$ is the base-emitter voltage of the transistors 21 and 22; S is the cross section area of the core 35 of the transformer 30; Ni is the number of turn of the windings 31 and 32; and Bs is the saturation flux density of the core 35 of the transformer 30, respectively.

Accordingly, in the case where the oscillation frequency $f$ is selected to satisfy $f = 20$ KHz, since $V_{BE} = 0.6$ V and $B_s = 3000$, if the cross section area S is selected to be within a possible range (about 10 mm²), the number of turn Ni of the windings 31 and 32 becomes on the order of 3.

The number of turns Nc of the current feedback winding 33 of the transformer 30 must be selected to satisfy the following expression (2):

$$Nc = Ni/h_{fe} \qquad (2)$$

where $h_{fe}$ is the current amplification factor of each of the transistors 21 and 22.

Since the factor $h_{fe}$ of the transistors 21 and 22 is about 10, the number of turns Nc of the winding 33 of the transformer 30 becomes 0.3.

In fact, however, it is impossible to wind the winding 33 by 0.3, so that the winding 33 is wound by an integer multiple number of turns more than 1. If the winding 33 is wound more than the required number of turns, the amount of current feedback which takes place through the winding 33 becomes excessive, which results in that the base current of the transistors 21 and 22 becomes excessive also. When the base current of the transistors 21 and 22 becomes excessive, the switching characteristics of the transistors 21 and 22 are deteriorated due to their storage effect. As a result, upon the change of ON and OFF of the transistors 21 and 22 both the transistors become ON at the same time to cause power loss. Further, when the base current of the transistors 21 and 22 are great, their base-emitter voltage $V_{BE}$ becomes also great. Thus, as may be apparent from the equation (1), the oscillation frequency $f$ is changed or increased.

An example of the transistor inverter according to the present invention free from the above defect of the prior art will be hereinafter described with reference to FIG. 2, in which reference numerals which are the same as those used in FIG. 1 designate the same elements, so that their description will be omitted.

Figure 2:
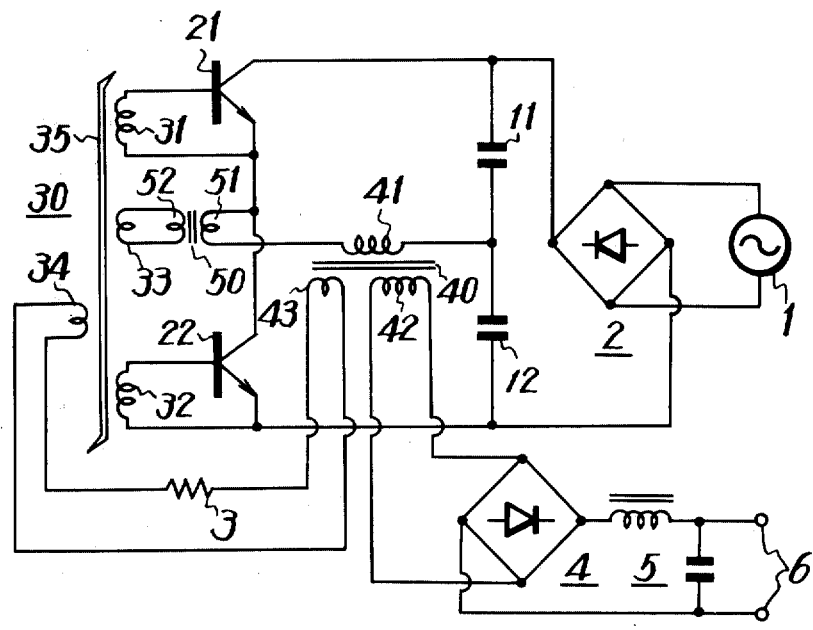
FIG. 2 is a circuit diagram showing an embodiment of the transistor inverter according to the present invention.

In order to avoid such a defect inherent in the prior art, with the transistor inverter of the present invention, a transformer 50 is provided, as shown in FIG. 2, through which the alternating current flowing in the input winding 41 of the transformer 40 is supplied to the current feedback winding 33 of the transformer 30. That is, an input winding 51 of the transformer 50 is connected between the winding 41 of the transformer 40 and the connection point of the transistors 21 and 22, and an output winding 52 of the transformer 50 is connected to the current feedback winding 33 of the transformer 30.

In this case, if the numbers of turns of the input and output windings 51 and 52 of the transformer 50 are taken as Na and Nb, respectively, the above equation (2) can be expressed as follows:

$$Nc = \frac{Ni}{h_{fe}} \cdot \frac{Nb}{Na} \qquad (3)$$

Therefore, if the ratio Nb/Na is selected suitably, the amount of feedback current through the winding 33 of the transformer 30 can be prevented from being excessive even though the number of turns Nc of the winding 33 is selected at an integer. By way of example, when the values of $V_{BE}$, Bs and so on are selected as previously mentioned, the equation (3) can be satisfied by selecting $Na = 1$ and $Nb = 3$, even though $Nc = 1$, so that the amount of feedback current can be prevented from being excessive.

Thus, since adequate current feedback can be carried out, it is avoided that the base current of the transistors 21 and 22 becomes excessive, and accordingly, there is no fear that any power loss is caused and the oscillation frequency $f$ is changed. In addition, the transformer 50, which is simple in construction, is sufficient for achieving the above effect, the transistor inverter of the present invention can be made easily and inexpensively.

The above description is given on only a single preferred embodiment of the present invention, but it may be apparent that many modifications and variations could be effected by one skilled in the art without departing from the spirit or scope of the novel concepts of the present invention.

We claim as our invention:

1. A transistor inverter comprising:
    a. a DC voltage source having first, second and third terminals;
    b. an output transformer having primary and secondary windings;
    c. a pair of first and second transistors each having base, emitter and collector electrodes, each of the collector and emitter electrodes of said first and second transistors being connected between the first and second terminals of said DC voltage source and between the second and third terminals of said DC voltage source through the primary winding of said output transformer, respectively;
    d. an input transformer having a voltage feedback winding, a pair of voltage control windings and a saturable core;
    e. circuit means for coupling the voltage across said primary winding of said output transformer to said voltage feedback winding and connecting each of the voltage control windings of said input transformer between the base and emitter electrodes of said first and second transistors, respectively;
    f. DC voltage output means connected to the secondary winding of said output transformer, and
    g. means for feeding back one part of the primary current flowing through the primary winding of said output transformer to said input transformer, the last mentioned means further including means for producing a predetermined desired amount of said current feedback.

2. A transistor inverter according to claim 1, in which said feedback means comprises a further transformer having primary, secondary and current feedback windings, the primary winding of which is connected in series with said primary winding of said output transformer, said secondary and current feedback windings of which are connected in a closed loop circuit, and the current feedback winding of which is also magnetically coupled to the saturable core of said input transformer.

3. A transistor inverter according to claim 2, in which the winding ratio of said primary winding (Na), secondary winding (Nb), current feedback winding (Nc) of said further transformer and said voltage control winding (Ni) of said input transformer are determined by the following equation, $$Nc = \frac{Ni}{h_{fe}} \cdot \frac{Nb}{Na}$$

wherein, $h_{fe}$ indicates the amplification factor of said first and second transistors.

4. A transistor inverter according to claim 3, in which each of said first and second transistors is of an NPN-type.

5. A transistor inverter according to claim 3, in which said circuit means includes a voltage detecting winding provided at the secondary side of said output transformer and said voltage detecting winding forms a closed loop circuit with said voltage feedback winding.

6. A transistor inverter according to claim 5, in which said closed loop circuit includes a resistor.

7. A transistor inverter according to claim 6, in which said DC voltage output means comprises a diode bridge circuit with first through fourth connection points, the first and second connection points of which are connected across the secondary winding of said output transformer, an L-C filter circuit connected between said third and fourth connection points, and a DC output terminal connected across a capacitor of said L-C filter circuit.

8. A transistor inverter comprising:
a. a DC voltage source having first, second and third terminals;
b. an output transformer having primary and secondary windings;
c. a pair of first and second transistors each having base, emitter and collector electrodes, each of the collector and emitter electrodes of said first and second transistors being connected between the first and second terminals of said DC voltage source and between the second and third terminals of said DC voltage source through the primary winding of said output transformer, respectively;
d. an input transformer having a voltage feedback winding, a current feedback winding, a pair of voltage control windings and a saturable core;
e. circuit means for coupling the voltage across said primary winding of said output transformer to said voltage feedback winding and connecting each of the voltage control windings of said input transformer between the base and emitter electrodes of said first and second transistors, respectively;
f. DC voltage output means connected to the secondary winding of said output transformer; and
g. feedback transformer means having first and second windings for feeding back one part of the primary current flowing through the primary winding of said output transformer to said input transformer, said first winding connecting with said current feedback winding and said second winding connecting to the primary winding of said output transformer;
whereby the winding ratios of said transformer means permits a predetermined amount of current feedback for faster switching of said first and second transistors.

* * * * *